UNITED STATES PATENT OFFICE.

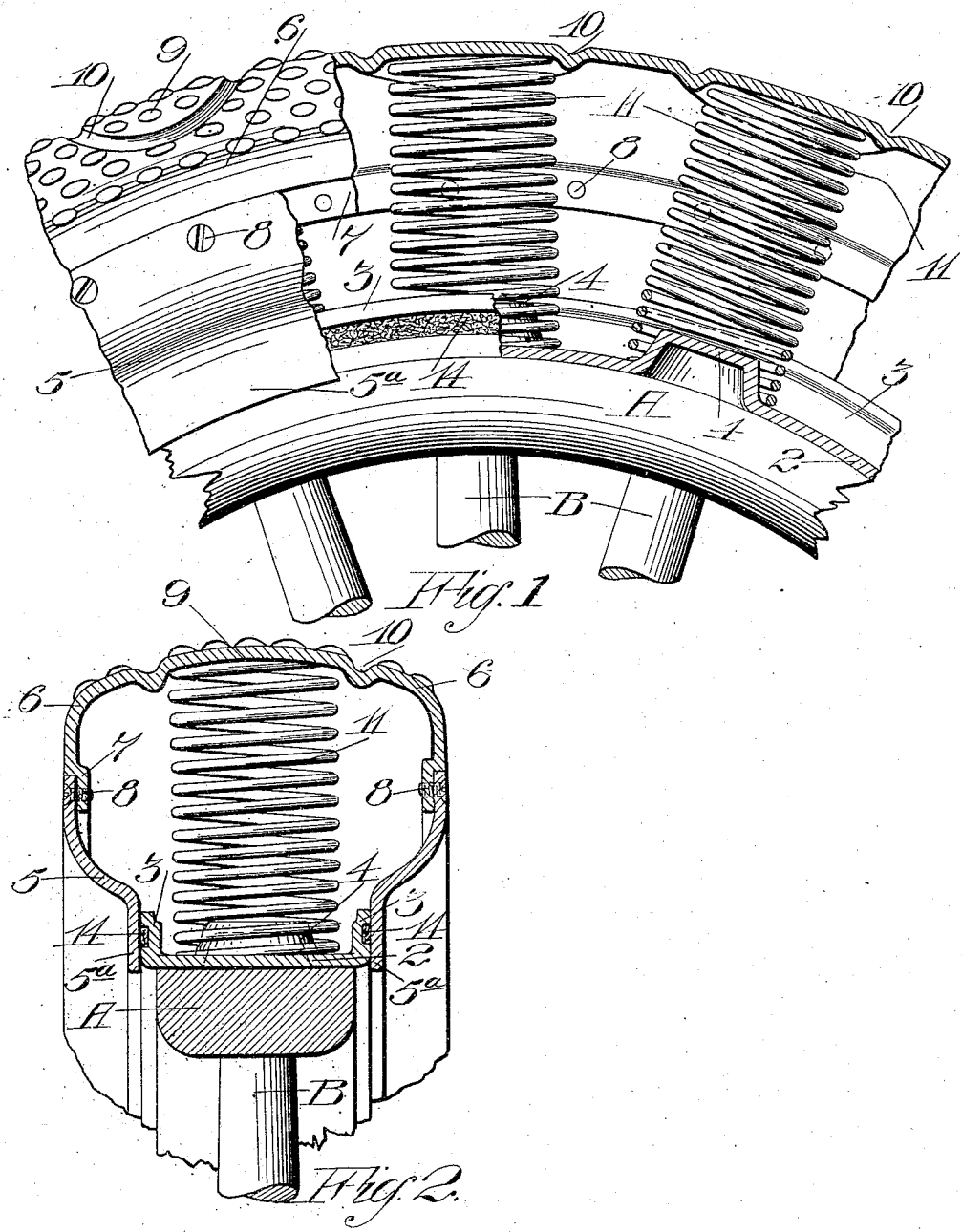

CHARLES A. WHEATON, OF STOCKTON, CALIFORNIA.

ELASTIC TIRE FOR WHEELS.

994,353.  Specification of Letters Patent.  Patented June 6, 1911.

Application filed May 16, 1910. Serial No. 561,526.

*To all whom it may concern:*

Be it known that I, CHARLES A. WHEATON, citizen of the United States, residing at Stockton, in the county of San Joaquin and State of California, have invented new and useful Improvements in Elastic Tires for Wheels, of which the following is a specification.

My invention relates to improvements in tires for vehicle wheels which are applied to automobiles and like vehicles.

It consists of a wheel of any usual or suitable construction, with an independent removable elastic rim or tire.

It also comprises a combination of parts and details of construction which will be more completely described by reference to the accompanying drawings, in which—

Figure 1 is a part elevation and part section of a portion of a wheel embodying my invention. Fig. 2 is a transverse section in a plane transverse to the wheel axis.

My improved tire is an independent structure which is applicable to wheels already constructed.

A is the felly of a wheel, having spokes or connections B extending therefrom to the central hub, these being of any usual or suitable construction.

In carrying out my invention, I apply a rim 2 to the felly A and fix it thereto in any usual or suitable manner. This rim is in the form of a substantial flat band, having upturned flanges 3, with parallel sides, and having projections or lugs 4 formed at intervals along the central portion and intermediate the sides.

5 are annular flanges, and 6 is the outside portion of my tire, the inner edges of which are designed to meet and form a joint with the outer edges of the flanges 5.

7 are offset flanges from the inner edges of the member 6, which extend within the outer edges of the plates 5, and coincident bolt-holes may be made through the two parts to receive bolts, as at 8, by which they may be secured together.

As shown in Fig. 1 the outer member 6 of my tire is formed with a tread portion, 9, with circular depressed channels, 10, upon the face, the circular projections formed by these channels on the inner surface of the member, 6, serving to retain in position the outer ends of suitable springs, 11, hereinafter mentioned. The springs 11 are adapted to be compressed between the rim member 2 and the exterior member 6. These springs are made sufficiently stiff, and in suitable numbers, so that when properly compressed between the two members 2 and 6 they will have sufficient strength to support the weight of the vehicle and sufficient resiliency to yield to shocks caused by irregularities of the road. The inner ends of the spring members fit over the projecting lugs 4, and are thus held in position.

This elastic tire may be completed in readiness to be applied to the wheel, and can be afterward placed upon the wheel and properly secured, or it may be built upon the wheel at the time of application.

The method of completing this tire may be as follows: The outer member 6, and one of the annular rims 5, may be bolted together, or in some cases, if found desirable, this outer member and the part 5 upon one side may be made integral in a single piece. The part 5 upon the inside not being in place, it will be seen that the springs 11 may be compressed and placed in position around the interior portion, and when these are all in place the section 5 may be applied and bolted securely in place. The springs will then be inclosed, and the downwardly projecting parallel flanges 5ª of the parts 5 will fit snugly, but with a sliding movement exterior to the upturned flanges 3 of the rim 2. In order to prevent the entrance of dirt or moisture into the interior of the spring-containing casing thus formed, annular grooves or channels are made in the flanges 3 and suitable gaskets 14 are fitted into these channels, thus forming a close joint between the parts 3 and 5ª.

A tire thus constructed has in itself all the necessary resiliency for the purposes for which it is designed, and independent of any special construction of the wheel itself. It may be secured upon the felly by any suitable or well known means, and may be removed or replaced as an entirety, or by removing one of the annular sections 5 the interior can be reached for any required purpose.

Having thus described my invention, what I claim and desire to secure by Letters-Patent, is—

In a wheel tire, the combination of a casing formed of two parts, one circumscribing the other, one of said parts converging inwardly and having inwardly extending radial flanges, and the other of said parts having circular depressed channels forming grooves on the outer face and projections on the inner face of the member, the adjacent ends of the two parts of the casing overlapping and secured together, a felly having a rim with side edges turned at right angles and parallel with the radial flanges of the inner member of the casing, said rim having lugs projecting outwardly between the flanges, and springs fitting over the lugs of the rim and inside the circular projections formed on the inner face of the outer member of the casing.

In testimony whereof I have hereunto set my hand in the presence of two subscribing witnesses.

CHARLES A. WHEATON.

Witnesses:
E. A. DAVISON,
W. J. RHOADS.

Copies of this patent may be obtained for five cents each, by addressing the "Commissioner of Patents, Washington, D. C."